United States Patent [19]

Borlinghaus et al.

[11] Patent Number: 5,735,500
[45] Date of Patent: *Apr. 7, 1998

[54] CHUCKLESS POWER SEAT ADJUSTER SLIDE

[75] Inventors: Hans Juergen Borlinghaus; James Peter Nini; Thomas Bernard Blake, all of Clinton Township, Macomb County, Mich.

[73] Assignee: General Motors Corporation, Detroit, Mich.

[*] Notice: The term of this patent shall not extend beyond the expiration date of Pat. No. 5,586,740.

[21] Appl. No.: 548,892

[22] Filed: Oct. 26, 1995

[51] Int. Cl.$^6$ .................................................. F16M 13/00
[52] U.S. Cl. .......................... 248/419; 248/157; 248/424
[58] Field of Search .................................. 248/419, 420, 248/421, 422, 423, 424, 429, 430, 157

[56] References Cited

U.S. PATENT DOCUMENTS

| | | | |
|---|---|---|---|
| 2,784,764 | 3/1957 | Rigby et al. | 248/419 |
| 2,875,809 | 3/1959 | Ragsdale et al. | 155/14 |
| 2,919,744 | 1/1960 | Tanaka | 248/419 |
| 3,006,594 | 10/1961 | Gruendler | 248/424 |
| 3,066,907 | 12/1962 | Latimer et al. | 248/420 |
| 3,137,472 | 6/1964 | Louten, Jr. et al. | 248/420 |
| 3,182,947 | 5/1965 | Tanaka | 248/421 |
| 3,410,515 | 11/1968 | Posh | 248/419 |
| 4,015,812 | 4/1977 | Heesch | 248/394 |
| 4,344,594 | 8/1982 | Hirth | 248/421 |
| 4,533,106 | 8/1985 | Stockl | 248/421 |
| 4,756,576 | 7/1988 | Bianchi et al. | 297/325 |
| 4,949,585 | 8/1990 | Dauvegne et al. | 74/89.15 |
| 4,966,045 | 10/1990 | Harney | 248/421 X |
| 5,046,697 | 9/1991 | Detloff et al. | 248/394 |
| 5,112,018 | 5/1992 | Wahls | 248/394 |
| 5,222,402 | 6/1993 | White et al. | 74/89.14 |
| 5,321,617 | 6/1994 | Mori et al. | 364/424.05 |
| 5,349,878 | 9/1994 | White et al. | 74/89.14 |
| 5,456,439 | 10/1995 | Gauger | 248/429 |
| 5,586,740 | 12/1996 | Borlinghaus et al. | 248/157 |

*Primary Examiner*—Leslie A. Braun
*Assistant Examiner*—Anita M. King
*Attorney, Agent, or Firm*—Patrick M. Griffin; Ernest E. Helms

[57] ABSTRACT

A six-way powered seat adjuster slide unit which in a preferred embodiment includes a top rail with first and second ends for mounting a vehicle seat; a bottom rail with first and second ends for supporting the top rail; a floor rail for slidably mounting the bottom rail in a fore and aft position; a first forward powered jack screw unit pivotally connected to the bottom rail and having a rotative shaft, the first jack screw unit having an upper pivotal axis in a position axially fixed with respect to the first end of the top rail; an elevator arm pivotally connected adjacent to the second ends of the top and bottom rails; a second rearward powered jack screw unit with a rotative shaft having a pivotal axis with the bottom rail and the elevator arm; and a motor fixed with the bottom rail allowing a gear to mesh with a portion of the bottom rail for providing selective fore and aft adjustment of the adjuster slide unit.

1 Claim, 4 Drawing Sheets

5,735,500

CHUCKLESS POWER SEAT ADJUSTER SLIDE

FIELD OF INVENTION

The field of the present invention is that of powered seat adjuster slides and seat adjusters for automotive vehicles, especially six-way powered seat adjusters.

BACKGROUND OF THE INVENTION

Six-way powered seat adjusters and seat adjuster slides are well known in the art. An example is Borlinghaus et al, U.S. Pat. No. 4,664,351, commonly assigned. Many, if not most, conventional powered seat adjuster slide units used in the automotive market today have a top rail which is mounted on top of a bottom rail. At the fore and aft ends of the top and bottom rails is a jack screw unit to elevate the top rail by selective vehicle operator demands. Virtually all units have a lost motion window to allow for movement of the top rail with respect to the bottom rail without deformation of the metal. Lost motion windows are undesirable because they give greater possibility for experiencing chuck. Chuck is the motion experienced when sitting in the seat wherein the seat adjuster slightly moves due to the slack in the components.

SUMMARY OF THE INVENTION

The present invention in a preferred embodiment provides a jack screw-type seat adjuster slide unit having a front lift mechanism with a rotatable jack screw which is pivotally connected to top and bottom rail assemblies. The top and bottom rail assemblies at their rearward ends are pivotally connected via an elevator arm. A second jack screw unit which is pivotally connected to the bottom rail is also pivotally connected to the elevator arm. Independent or simultaneous lift may be achieved. Additionally, the seat adjuster slide unit requires no utilization of a stabilizer arm between the top and bottom rails while at the same time eliminating any lost motion windows, thereby greatly reducing chuck.

DESCRIPTION OF PREFERRED EMBODIMENT

Figure 1:
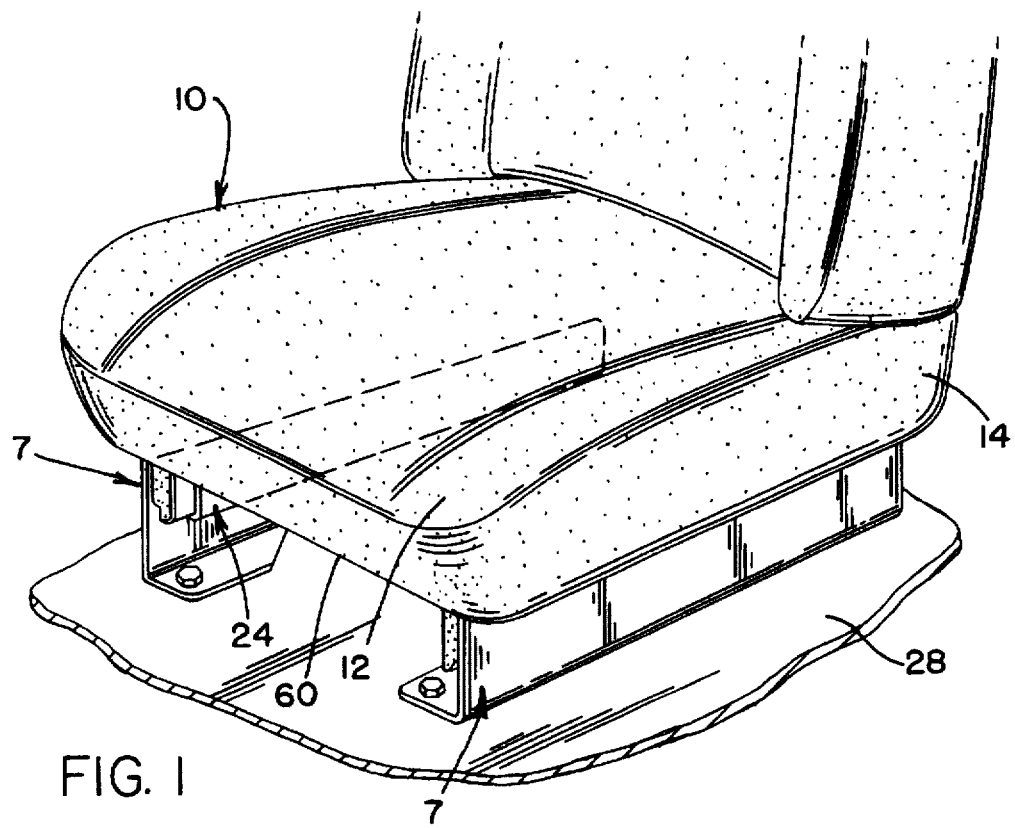
FIG. 1 is perspective view of a vehicle seat with a seat adjuster utilizing the preferred embodiment seat adjuster slide according to the present invention.
Figure 5:
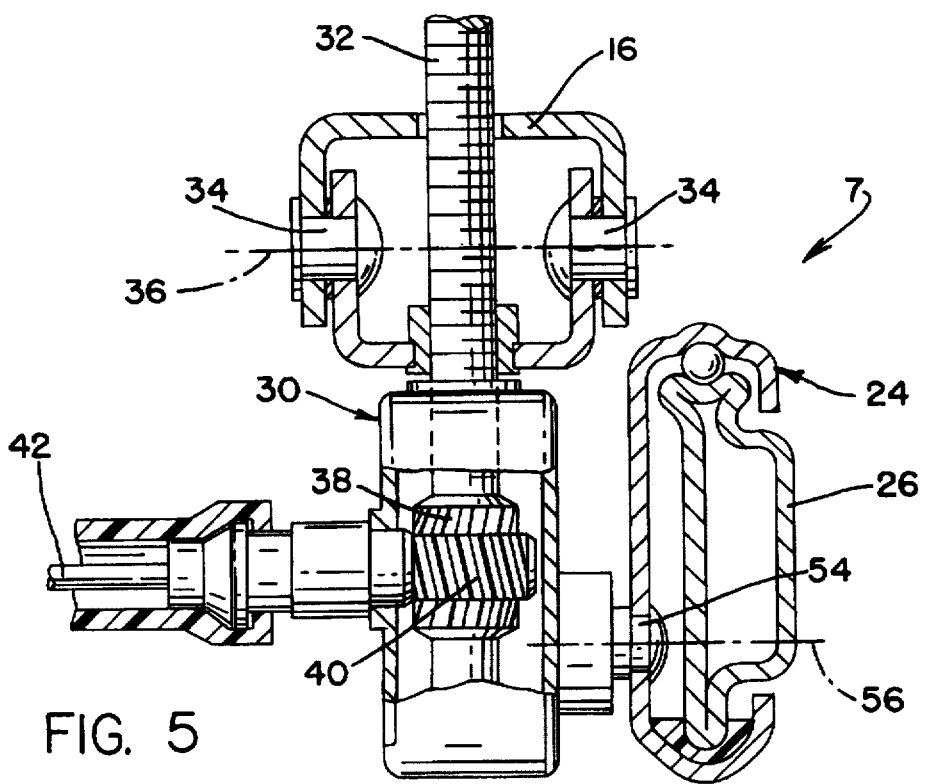
FIG. 5 is an enlarge view taken along line 5—5 of FIG. 2.
Figure 2:
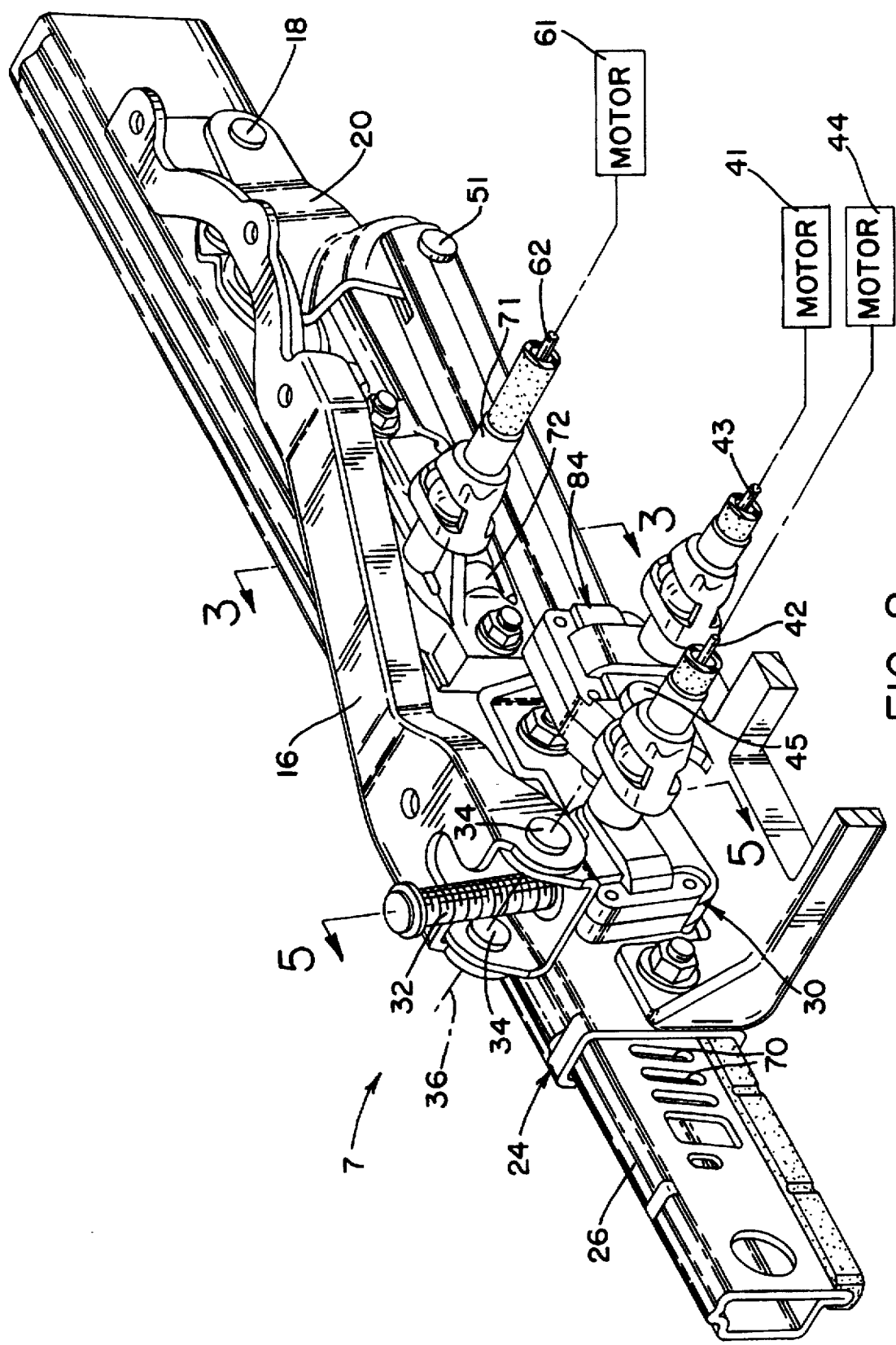
FIG. 2 is perspective enlarged view of the seat adjuster slide unit utilized in FIG. 1 with the vehicle seat removed for clarity of illustration showing a top rail, a bottom rail and a floor rail of the present invention.
Figure 3:
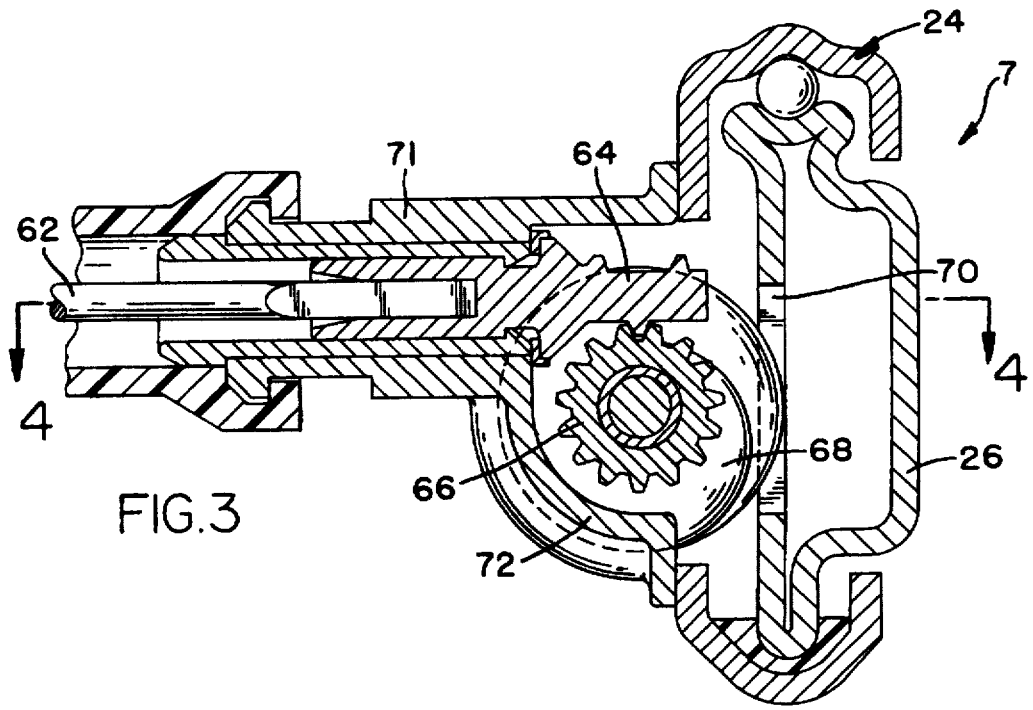
FIG. 3 is an enlarged view taken along line 3—3 of FIG. 2.
Figure 4:
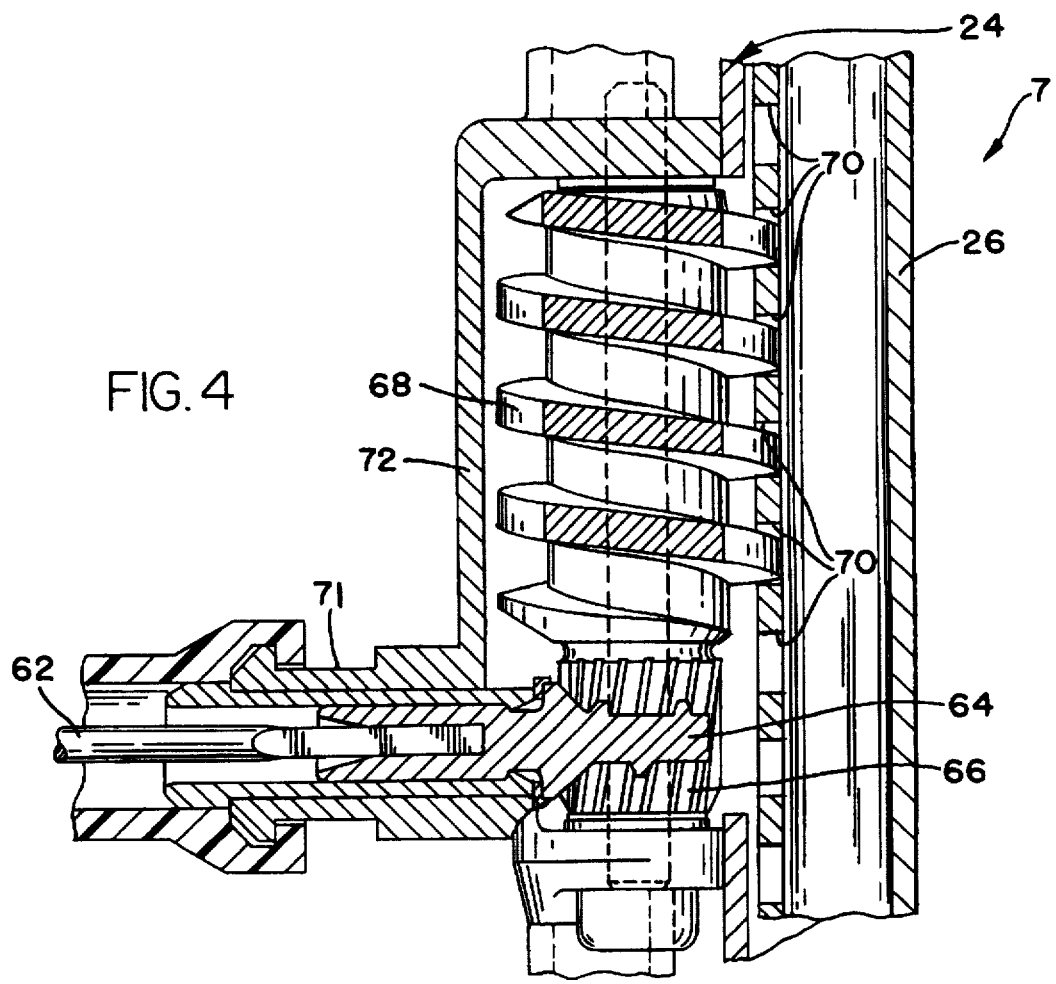
FIG. 4 a view taken along line 4—4 of FIG. 3.

Referring to FIGS. 1-5, the seat adjuster slide unit 7 according to the present invention is shown in FIG. 1 in an environment supporting a vehicle seat 10. The seat adjuster slide unit allows the vehicle seat 10 to be adjusted in a fore and aft direction and vertically up and down along the vehicle seat front end 12 and rear end 14.

To support a vehicle seat, there is provided a top rail 16. The rearward end of top rail 16 is pivotally connected via a pin 18 to an elevator arm or bell crank 20 which is generally triangular, and which has three potential pivot points near the apexes of the triangle, an intermediate,inner and outer pivot point. Pin 18 is located at the outer pivot point. To allow for fore and aft movement of the adjuster slide unit 7, the bottom rail 24 which has a generally C-shaped cross-sectional area is slidably mounted on a floor rail 26 which is held fixed in a suitable manner with respect to a vehicle floor 28.

To set the elevation of the front end of the vehicle seat, there is a front adjuster mechanism 30. The front adjuster mechanism 30 has a jack screw unit with a rotative screw or shaft 32. The rotative jack screw shaft 32 via pins 34 has a pivotal axis 36 with the top rail 16. The axis 36 is in a fixed location with respect to the top rail 16. The jack screw shaft 32 is encircled by a first gear 38 which is angularly fixed with respect to the jack screw shaft 32. To power the first gear 38, there is meshed with the same a second gear 40 which has a horizontal axis of rotation. The second gear 40 is in turn powered by a cable 42 which is torsionally associated with an electric motor 44. A second output end of the motor 44 (not shown) is for connection to a cable (not shown) to power the front seat mechanism for the adjuster slide unit 7 on the other side of the vehicle seat (shown only in FIG. 1). A pin 54 gives the jack screw unit 30 a pivotal axis 56 which is fixed with respect to a forward end of the bottom rail 24.

Pivotally connected via a pin 22, at the intermediate pivot point, to a generally rearward end of the floor channel 24 is the elevator arm 20. The elevator arm 20 is also pivotally connected to the top rail 16 by a pin 18.

A rear jack screw unit 84 powered by a motor 41 via a cable 43 is configured in a manner similar to the first jack screw unit 30 and is pivotally connected to the lower rail 24 via a pin 45. The rear jack screw unit 84 has a rotative shaft 47 which is inserted within an interiorly threaded cylinder 49. Optionally, cylinder 49 will not have interior threads but will instead mount in its interior cavity a nut. Rotation of the threaded shaft 47 will cause the cylinder 49 to be extended or retracted. Cylinder 49 at its rearward end via a pin 51 is, at the inner pivot point pivotally connected to the elevator arm 20.

Since pins 45 and 22 have fixed positions with respect to the bottom rail 24 and since the rear adjuster unit 84 has a fixed pivotal axis with the pin 51 of the elevator arm, the elevator arm position is locked and can only be changed with activation of the jack screw unit 84. With the locking of elevator arm 20, the stabilized positions of the top rail 16 and the jack screw unit are also set. Therefore, no stabilizer link is needed between the top rail 16 and the bottom rail 24.

To power the seat adjuster slide 7 in the fore and aft direction, the bottom rail 24 or the seat bottom 60 can mount an electric motor 61, which in turn powers a cable 62, a gear 64, a gear 66 and a worm gear 68 to mesh within slots 70 provided in the floor rail 26. The seat adjuster slide on the opposing side of the seat adjuster may be powered in a similar fashion in the fore and aft direction by a cable (not shown) from an electric motor 61 which feeds into an outlet 71 of a gear box 72.

Figure 6A:
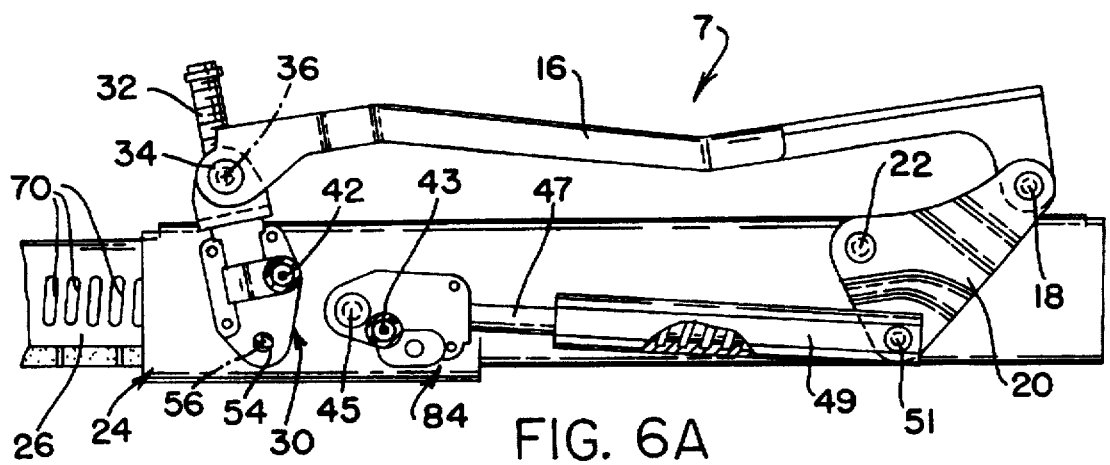
FIGS. 6A 6B AND 6C are partial side elevational views demonstrating operation of the seat adjuster slide unit according to the present invention.
Figure 6B:
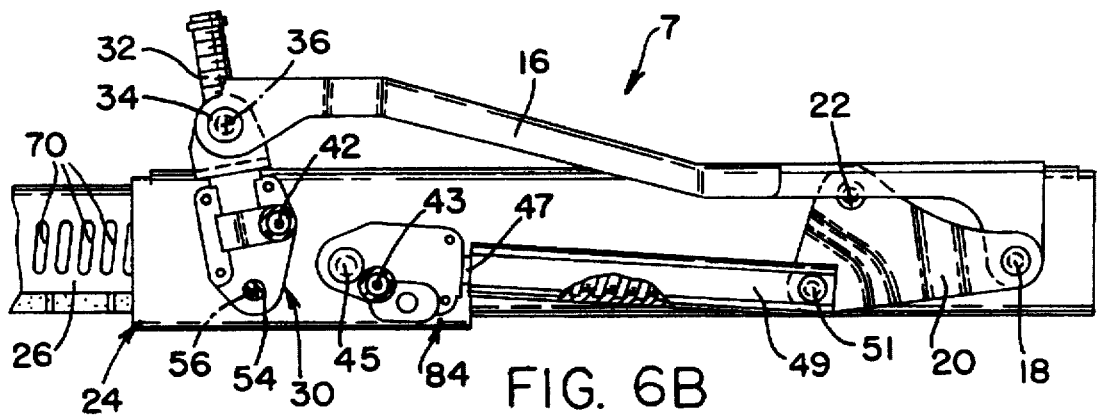
Figure 6C:
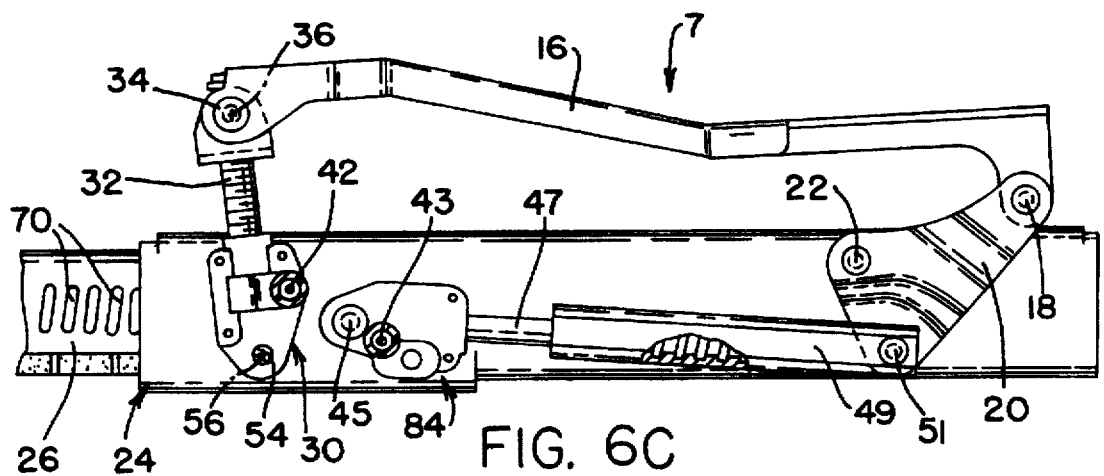

Referring to FIGS. 6A, 6B and 6C, the operation of the vehicle adjuster slide unit 7 is shown in 6A with the rear jack screw unit 84 in an elevated lifted position. It is apparent to those skilled in the art that pin 18 must travel along a fixed radius with respect to the pin 22. Therefore, when lifting up the rear end in FIG. 6A, the front end jack screw unit 30 pivots about the pin 54 to accommodate the lost motion. When the seat adjuster unit 7 goes from a position shown in FIG. 6A to a position shown in FIG. 6C, the front jack screw unit 30 will be extended, causing the front jack screw unit 30 to tilt about pin 54. When the seat adjuster slide unit 7 returns to its lowermost position from its uppermost position shown in FIG. 6C, the shafts of both jack screw units 30 and 84 will be rotated to bring the units 30 and 84 to their downwardmost position.

While this invention has been described in terms of a preferred embodiment thereof, it will be appreciated that other forms could readily be adapted by one skilled in the art. Accordingly, the scope of this invention is to be considered limited only by the following claims.

What is claimed is:

1. A powered seat adjuster slide unit, comprising:

a top, generally horizontally oriented vehicle seat mounting rail having first and second ends;

a bottom, generally horizontally oriented bottom rail for supporting said top rail, said bottom rail having first and second ends corresponding to said top rail first and second ends;

a first, generally vertically oriented powered jack screw unit having a lower end pivoted to said bottom rail first end at a pivot axis fixed with respect to said bottom rail and an upper end pivoted to said top rail first end at a pivot axis fixed with respect to said top rail;

a second, generally horizontally oriented powered jack screw unit having an inner end pivoted to said bottom rail intermediate said bottom rail first and second ends at a pivot axis fixed with respect to said bottom rail and also having an outer end;

a single bell crank having an inner pivot point, and outer pivot point, and an intermediate pivot point, with said intermediate pivot point pivoted directly to said bottom rail second end at a pivot axis fixed with respect to said bottom rail, with said inner pivot point pivoted directly to the outer end of said second jack screw unit below said intermediate pivot point at a pivot axis fixed with respect to said bell crank and with said outer pivot point pivoted directly to said top rail second end at a pivot axis fixed with respect to said top rail; with said jack screw units and single bell crank constituting the only operative physical connections between said top and bottom rails;

whereby, by virtue of all of said pivot axes being fixed relative to said top rail, bottom rail, and bell crank, said top rail can be moved and adjusted relative to said bottom rail just by extending and retracting said jack screw units and are locked and stabilized in any relative adjusted position thereof.

* * * * *